May 29, 1951 R. L. LEVY 2,554,581
SHOCK ABSORBER WITH RETRACTABLE STROKE FOR AIRPLANES
Filed May 27, 1946 2 Sheets-Sheet 1

Inventor
R. L. Levy

May 29, 1951        R. L. LEVY        2,554,581

SHOCK ABSORBER WITH RETRACTABLE STROKE FOR AIRPLANES

Filed May 27, 1946        2 Sheets-Sheet 2

Inventor
R. L. Levy

Patented May 29, 1951

2,554,581

UNITED STATES PATENT OFFICE 2,554,581

SHOCK ABSORBER WITH RETRACTABLE STROKE FOR AIRPLANES

René Lucien Levy, Paris, France, assignor to Société d'Inventions Aeronautiques et Mecaniques S. I. A. M., Geneva, Switzerland, a corporation of Switzerland Application May 27, 1946, Serial No. 672,509
In France July 31, 1941

Section 1, Public Law 690, August 8, 1946
Patent expires July 31, 1961

11 Claims. (Cl. 244—102)

The present invention relates to contractable oleo-pneumatic shock absorbing struts for retractable landing gear.

More particularly, the invention relates to such a strut including a cylinder and in which liquid contained between two interconnected pistons that are movable in the cylinder traverses upon movement of the pistons small passages in a diaphragm that is fixed to the cylinder between the pistons with a gas under pressure exerting shock absorbing action above the upper piston.

In this type of arrangement when it is desired to contract such a strut in order to retract the landing gear, the two pistons are raised in their common cylinder by overcoming the pressure which exists above the upper piston and which operation necessitates a considerable expenditure of energy.

The present invention therefore has for an object to provide a shock absorbing strut of this character in which the contraction is effected without substantially compressing the gas situated above the upper piston.

According to the invention the two pistons instead of being interconnected for simultaneous movement as is the common practice are united one to the other by a traction rod secured to one of the pistons and which, during contraction of the strut corresponding to the retraction of the landing gear, slides in the interior of the other piston, while the excess liquid that is enclosed between the two pistons is permitted to escape.

The main features of the strut in accordance with the invention, therefore, are as follows:

1. The rod of the upper piston traverses the lower piston and enters into a chamber formed in a hollow rod for the lower piston and terminates within the chamber in a flange or a head;

2. It is the liquid pressure acting on the lower surface of the lower piston for effecting contraction which controls the opening of a valve permitting the evacuation of the excess liquid which is contained between the two pistons;

3. This excess liquid thus evacuated or flowing from the space compressed between the two pistons is collected in an accumulator, and re-used, therefore assuring the subsequent expansion of the strut.

In a first embodiment of this invention this accumulator is disposed exteriorly of the strut.

In a second embodiment the accumulator is integrated with the strut, the hollow rod of the lower piston being so formed as to provide the two chambers, preferably concentric, one of which is in permanent communication with the space between the two pistons and the other chamber constituting the accumulator which receives during retraction of the gear and contraction of the strut the excess liquid expelled from the first-mentioned chamber.

In the following specification reference is made by way of example to the attached drawings, in which:

Figure 3 is a diagrammatic view of a third embodiment.

Figure 1:
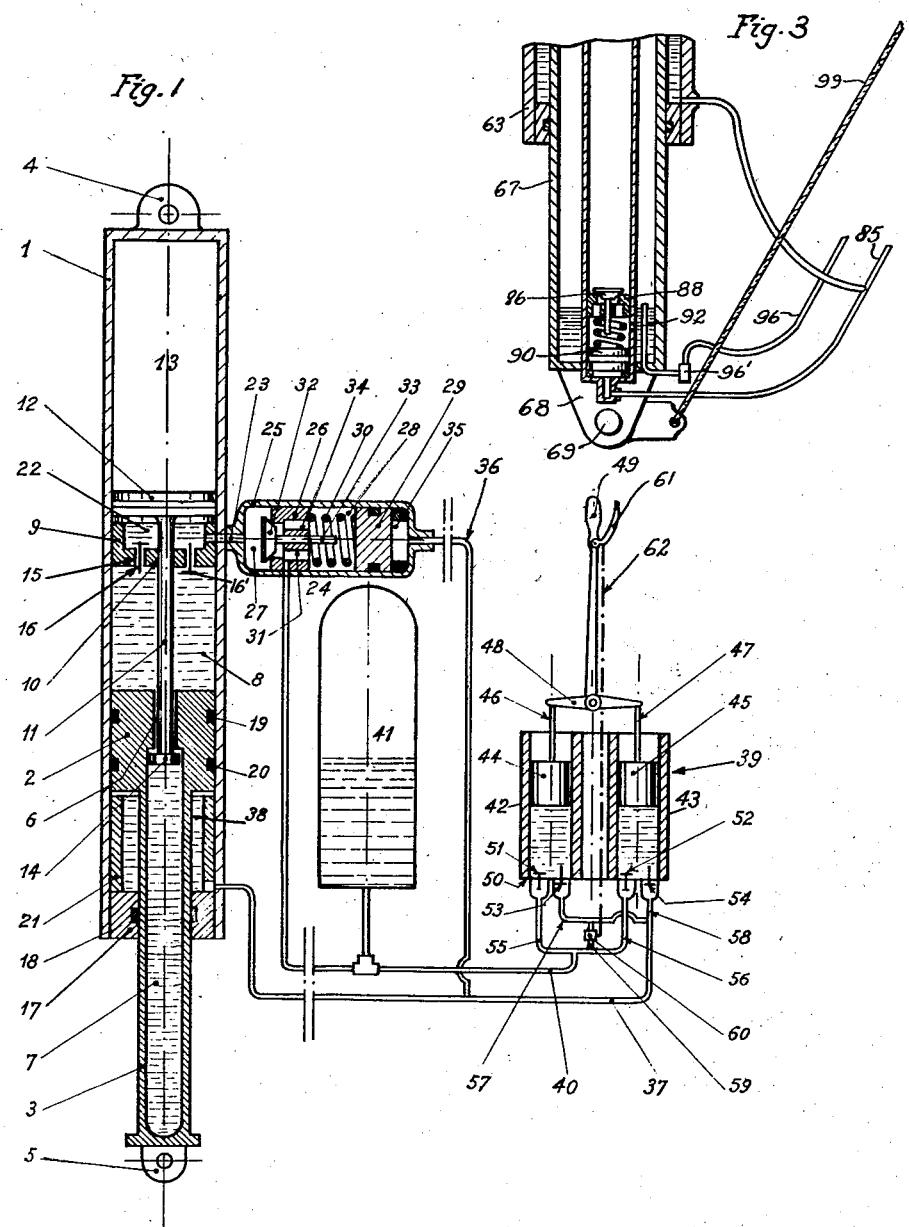
Figure 1 is a diagrammatic view of a first embodiment of a contractable oleo-pneumatic shock absorbing strut according to the invention.

With reference to Figure 1, the strut comprises a cylindrical body 1 in which is mounted a lower piston 2 the rod 3 of which is hollow. The cylinder 1 is attached or pivoted to the fuselage or other structural part of the aeroplane by a lug 4 and the hollow piston rod 3 is connected to the rolling gear by a lug 5 carried on the rod 3. The piston 2 is traversed by a central bore or channel 6 which communicates at one end with the chamber 7 constituting the hollow portion of the rod 3 and at its other end with a compartment or chamber 8 formed between piston 2 and fixed diaphragm 9 disposed transversely of the cylinder 1. The diaphragm 9 is provided with a central opening 10 through which passes the rod 11 of a small or upper piston 12 placed in an upper gas containing chamber 13 formed at the top of the cylinder 1. This rod 11 traverses the chamber 8 and the bore or channel 6 in the head of the piston 2 and terminates within the chamber 7 in a circular head or flange 14 of a greater diameter than that of the channel 6 so that while piston 2 can move relative to rod 11 in sliding relationship the two elements are maintained in this slidable or telescopic relationship. The diaphragm 9 is further provided with orifices 15 controlled by valves 16 and 16' working in opposite directions. The hollow piston rod 3 traverses the bottom 17 of the cylinder 1 and fluid tgihtness is assured by the provision of a packing 18. The piston 2 is further provided with packing indicated at 19 and 20. Within the lower portion of the cylinder 1 and beneath the piston 2 is provided an abutment 21 which restricts the movement of the piston 2 toward the bottom of the cylinder 1. As previously indicated, the upper chamber 13 is filled with gas under pressure.

Between the upper surface of the diaphragm 9 and the lower surface of the piston 12 is provided a chamber 22 which is connected through orifice 23 in the cylinder 1 to a fluid receiving valve box 24 within which is disposed a valve 32. This valve box comprises a cylindrical body 25 divided by an apertured partition 26 into two chambers 27 and 28, the chamber 27 being adjacent the chamber 22 and in communication therewith. In chamber 28 is movable a free plunger or piston 29 which is subjected to the action of a calibrated spring 30 bearing against the partition 26. The numeral 31 denotes apertures in the partition 26, the passage of fluid through which is controlled by the valve 32. The stem 33 of this valve which traverses a central bore or guide 34 axially of the partition 26 is moved by the movement of the plunger 29 toward partition 26 when the plunger is moved with sufficient force to overcome the action of the spring 30. A chamber 35 is provided in the rear or remote end of the box 24 behind the plunger 29 and communicating with this chamber is a tube 36 which is in communication with a tube 37, one end of which communicates with a chamber 38 formed between the bottom of cylinder 1 and the lower surface of piston 2 and the other end communicating with a distributor pump device indicated at 39. From the distributor 39 a pipe 40 provides communication with the valve box 24. Mounted in communication with this pipe 40 is an oleo-pneumatic accumulator 41. The distributor pump device 39 is constituted by a double-acting pump comprising two cylinders 42 and 43 arranged side by side and in which pistons 44 and 45 are respectively movable. The rods 46 and 47 of these pistons are united through a yoke 48 connected with an operating lever 49. At the bottom 50 of the two cylinders 42 and 43 are provided admission valves 51 and 52, respectively, and exhaust valves 53 and 54, respectively. The pipe 40 is divided into two branches 55 and 56 communicating through admission valves 51 and 52 with cylinders 42 and 43 and the pipe or tube 37 is divided into branches 57 and 58 communicating through exhaust valves 53 and 54 with the respective cylinders. A by-pass 59 interconnects pipes 37 and 40 adjacent the distributor device and the by-pass is controlled by valve 60 operated by handle 61 carried on the lever 49 through a suitable mechanical connection illustrated diagrammatically at 62.

The operation of the strut shown in Figure 1 is as follows:

In normal condition the valves 32 and 60 are closed, the shock absorber then functioning in its customary manner. Pistons 2 and 12 move in unison by reason of the incompressibility of the liquid filling chambers 22, 8 and 7. When it is desired to contract the strut lever 49 is reciprocated to and fro while pressing on handle 61. Upon this operation the pump sucks liquid from the accumulator 41 and delivers it under increasing pressure into pipe 37, this liquid under pressure passing through tube 36 and communicating with valve box 24 behind the plunger or piston 29, thereby pushing the plunger 29 against the action of spring 30 thus pushing valve stem 33 and opening valve 32. Simultaneously fluid entering chamber 38 causes piston 2 to rise and thereby contract the landing gear. The liquid contained in chamber 8 is forced by piston 2 into chamber 22 thence into chamber 27 and through pipe 40 into accumulator 41. The upward movement of piston 2 does not effect piston 12. Therefore, the contraction of the strut takes place in such a manner that the gas contained in chamber 13 is not substantially compressed beyond its normal working pressure. Thus energy normally utilized in conventional contractable strut arrangements to compress this gas is economized.

In order to expand the strut it is sufficient with lever 49 being stationary to press on handle 61. This places pipes 40 and 37 into communication with one another. The pressure in accumulator 41 built up by the preceding pumping operation is then exerted through pipe 40, valve 32, passage 23, chamber 22, valve 16' and chamber 8 on the upper side of piston 2 and through pipes 40, bypass 59, pipe 37 and chamber 38 on the lower side of this piston. Inasmuch as the surface area of the upper side of the piston receiving pressure of fluid from chamber 8 is greater than the surface area on the lower side of piston 2 through differential pressure action the piston 2 is pushed toward the bottom 17 of cylinder 1 until it is stopped by the abutment or collar 21.

Figure 2:
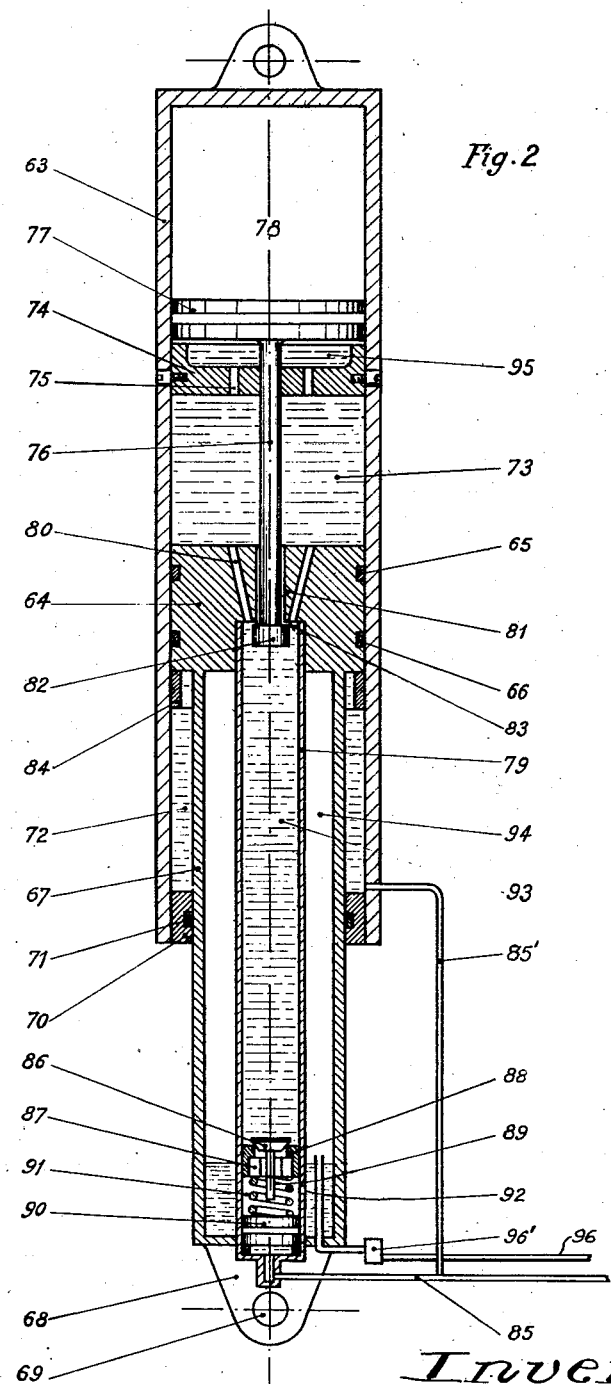
Figure 2 is a diagrammatic view of a second embodiment.

With reference to Figure 2 which illustrates a second embodiment of the contractible strut in accordance with the invention, the strut comprises a cylinder 63 within which is mounted a piston 64 provided with packing 65 and 66. The rod 67 of piston 64 is hollow and of large cross sectional area. This rod terminates in lug 68 provided with eye 69 for attachment to the rolling gear. The hollow rod 67 traverses the bottom 70 of the cylinder and fluid tightness is assured by means of packing 71. Piston 64 therefore subdivides the cylinder 63 into a lower annular chamber 72 and an upper chamber 73. This chamber 73 is limited by the provision of a fixed diaphragm 74 disposed transversely of the upper portion of cylinder 63 and which diaphragm is provided with orifices 75 and a central orifice which is traversed by a rod 76 of a small or upper piston 77 which in turn subdivides the upper part of cylinder 63 into two chambers 78 and 95. Piston 64 carries a tube 79 which is in communication by oblique passages 80 with chamber 73. Piston 64 also has a central passage or channel 81 through which passes rod 76 of piston 77 and which rod terminates within the tube 79 in a head or flange 82 that cooperates with the lower surface 83 of piston 64 which surface closes the upper part of tube 79. The connection between pistons 77 and 64 is therefore the same as the connection between pistons 12 and 2 in the embodiment shown in Figure 1.

A collar 84 fixed within cylinder 63 restrains the descent of piston 64 in a manner similar to abutment 21 shown in Figure 1. At the lower extremity of tube 79 is an opening to which is connected pipe 85 connected in turn with a distributor pump device similar to that described with reference to Figure 1, but not illustrated in Figure 2. A flexible branch pipe 85' provides communication between pipe 85 and annular chamber 72 of cylinder 63. The lower part of tube 79 constitutes a valve box functioning similar to the valve box 24 of Figure 1. As shown, a valve 86 is adapted to close orifices 87 of partition 88 fixed within tube 79. The axis of the stem 89 of valve 86 is guided within partition 88 and this stem 89 cooperates with a free plunger or piston 90 closely fitting within lower extremity of tube 79 and subjected on one side to the pressure of liquid issuing from pipe 85 and on the other side to the action of a calibrated spring 91. An orifice 92 provided in the wall of tube 79 between partition 88 and plunger 90 provides for communication between the interior space 93 of tube 79 and the annular space 94 between the inner wall of hollow piston rod 67 and the outer wall of tube 79. The chambers 73 and 95 situated respectively between the lower piston and the diaphragm and the diaphragm and the upper piston are filled with liquid and therefore chamber 93 formed within tube 79 is also full of liquid, since it communicates through passage 80 with chamber 73. The lower part of annular chamber 94 also contains a certain quantity of liquid. Above this liquid is a gas under pressure and the introduction of the liquid and gas under pressure into accumulator space 94 is effected through a pipe 96 provided with valve 96'.

The operation of this embodiment is similar to that described with reference to Figure 1;

Under normal conditions valve 86 is maintained on its seat by the pressure of the liquid contained in space 93. The shock absorber then functions in its customary manner. When it is desired to contract the strut it is only necessary to apply pressure through pipe 85. The liquid under pressure issuing from pipe 85 acts on the lower side of plunger 90 raising the same against the action of spring 91 thereby lifting valve 86 from its seat. Simultaneously fluid under pressure through branch 85' enters chamber 72 to raise piston 64. This action is effected without difficulty, the liquid contained in chamber 73 passing through passages 80, space 93, open valve 86 and orifice 92 into the annular space 94 which constitutes an accumulator. The landing gear then contracts. It is to be remarked that this contraction does not require a further compression of the gas which is already under strong pressure contained in chamber 78. To extend the strut it is only necessary to cut off the pressure developed by the pump in pipe 85; therefore, under the action of the energy accumulated in the annular space 94, the liquid contained in the lower part of this space returns to chamber 73 and piston 64 is moved downwardly to its normal position of operation due to a pressure differential as described in connection with Figure 1.

In the modification shown diagrammatically in Figure 3 the shrinkage of the telescopic strut 63—67 is coincident with the retraction of the landing gear and is effected by mechanical traction on lug 68 by means of a cable 99 in the manner shown and described in my prior Patent No. 2,294,916, issued September 8, 1942, the hydraulic pressure in this case being applied on the lower side of piston 90 through pressure line 85.

What I claim as my invention and desire to secure by Letters Patent is:

1. A contractable oleo-pneumatic shock absorbing strut for retractable landing gear, comprising a cylinder, two interconnected pistons movable in said cylinder, an apertured diaphragm fixed to said cylinder between the two pistons, a gas under pressure in the cylinder and exerting shock-absorbing action above the upper piston, a strut which comprises a hollow rod fixed to one of said pistons; a traction rod fixed to the other piston and slidable in said hollow rod to effect the contraction of the strut, said cylinder being filled with liquid beneath the upper piston and the liquid upon movement of the pistons passing through the diaphragm; and means to allow for the escape of excess liquid from the space between the two pistons during said contraction.

2. A contractable shock-absorbing strut for retractable landing gear comprising: a cylinder; a fixed diaphragm subdividing this cylinder into an upper and a lower chamber; a first piston subdividing said upper chamber into a chamber filled with gas under pressure and a chamber filled with liquid; a second piston, subdividing said lower chamber into two chambers filled with liquid, and having a hollow rod traversing the bottom of the cylinder and projecting below said bottom to carry the landing gear and a traction rod secured to the first piston, traversing said diaphragm and said second piston and ending in a head working in a chamber formed in the hollow rod of said second piston.

3. A contractable oleo-pneumatic shock-absorbing strut for retractable landing gear, which comprises: a cylinder; a fixed diaphragm subdividing this cylinder into an upper and a lower chamber; a first piston subdividing said upper chamber into a chamber filled with gas under pressure and a chamber filled with liquid; a second piston having a hollow rod and subdividing said lower chamber into two chambers filled with liquid; a telescopic mechanical connection between said two pistons; pressure means capable of acting under the second piston to contract the strut; an outlet for the escape of excess liquid from the chambers between the two pistons during said contraction; and a valve controlling said outlet and controlled by said pressure means.

4. A contractable oleo-pneumatic shock-absorbing strut for retractable landing gear, which comprises: a cylinder; a fixed diaphragm subdividing this cylinder into an upper and a lower chamber; a first piston subdividing said upper chamber into a chamber filled with gas under pressure and a chamber filled with liquid; a second piston having a hollow rod and subdividing said lower chamber into two chambers filled with liquid; a telescopic mechanical connection between said pistons; pressure means capable of acting under the second piston to contract the strut; an outlet for the escape of excess liquid from the chambers between the two pistons during said contraction; a valve controlling said outlet and controlled by said pressure means; and an oleo-pneumatic accumulator to receive said excess liquid, and to effect the extension of the strut with the aid of a pressure differential established between the two opposite faces of said second piston.

5. A contractable oleo-pneumatic shock-absorbing strut for retractable landing gear, which comprises: a cylinder; a fixed diaphragm subdividing this cylinder into an upper and lower chamber; a first piston subdividing said upper chamber into a chamber filled with gas under pressure and a chamber filled with liquid; a second piston having a hollow rod and subdividing said lower chamber into two chambers filled with liquid; a telescopic mechanical connection between said two pistons; pressure means capable of acting under the second piston to contract the strut; an outlet for the escape of excess liquid from the chambers between the two pistons during said contraction; an exterior valve controlling said outlet and controlled by said pressure means; an exterior oleo-pneumatic accumulator to receive said excess liquid; and means, controlled by said accumulator to effect the extension of the strut.

6. A contractable oleo-pneumatic shock-absorbing strut for retractable landing gear, which comprises: a cylinder; a fixed diaphragm subdividing this cylinder into an upper and a lower chamber; a first piston subdividing said upper chamber into a chamber filled with gas under pressure and a chamber filled with liquid; a second piston having a hollow rod and subdividing said lower chamber into two chambers filled with liquid; a telescopic mechanical connection between said two pistons; pressure means capable of acting under the second piston to contract the strut; an outlet for the escape of excess liquid from the chambers between the two pistons during said contraction; a valve inside said hollow rod for controlling said outlet and controlled by said pressure means; an oleo-pneumatic accumulator likewise inside said hollow rod to receive said excess liquid; and means, controlled by said accumulator, to effect the extension of the strut.

7. An contractable shock-absorbing strut for retractable landing gear comprising: a cylinder; a fixed diaphragm subdividing this cylinder into an upper and a lower chamber; a first piston subdividing said upper chamber into a chamber filled with gas under pressure and a chamber filled with liquid; a second piston, subdividing said lower chamber into two chambers filled with liquid, and having a hollow rod traversing the bottom of the cylinder and projecting below said bottom to carry the landing gear; a traction rod secured to the first piston, traversing axial passages provided in said diaphragm and in said second piston, respectively, and ending in a head working in the hollow rod of said second piston; and exterior means adapted to contract and extend the strut, respectively.

8. Strut according to claim 7 in which the means to contract and extend the strut comprises: a pump; an oleo-pneumatic accumulator; a valve-box; a pressure line connecting said pump to the chamber under the second piston; a branch of said pressure line connecting said pump to said valve-box; a return line connecting said valve-box, said accumulator and said pump; and a passage between the chamber under the first piston and said valve-box.

9. A contractable shock-absorbing strut for retractable landing gear comprising: a cylinder; a piston having a hollow rod projecting through the bottom of said cylinder; a tube in the axis of said rod; a pressure line in communication with the bottom of the annular chamber comprised between said piston and said bottom of the cylinder, and with the bottom of said tube, respectively; means to feed air and liquid in the annular space between said tube and said hollow rod; a valve in the bottom of said tube; and a passage between said bottom of the tube and said annular space.

10. A contractable shock-absorbing strut for retractable landing gear comprising: a cylinder; a piston having a hollow rod projecting through the bottom of said cylinder; a tube in the axis of said rod; a pressure line in communication with the bottom of said tube; means to feed air and liquid to the annular space between said tube and said hollow rod; a valve in the bottom of said tube under the control of said pressure line; a passage between said bottom of the tube and said annular space; and mechanical traction means to contract the strut upon retraction of the landing gear.

11. A contractable oleo-pneumatic shock absorbing strut for retractable landing gear including a cylinder, a diaphragm within and fixed to said cylinder and dividing the same into upper and lower compartments, said diaphragm having restricted passages therethrough, a piston in each compartment and respectively disposed on opposite sides of the diaphragm, resilient means above the piston in the upper compartment and defining shock absorbing means for the landing gear, said cylinder being filled with liquid below said upper piston, connecting means between the pistons permitting axial movement thereof relative to each other, said lower piston carrying a strut extending through the cylinder and having means thereon to carry the landing gear, means to contract the strut, said contracting means effecting movement of the lower piston relative to the upper piston, and means communicating with the cylinder to allow escape of excess liquid from the space between the pistons during contraction.

RENÉ LUCIEN LEVY.

REFERENCES CITED

The following references are of record in the file of this patent:

UNITED STATES PATENTS

| Number | Name | Date |
|---|---|---|
| 2,186,266 | Onions | Jan. 9, 1940 |
| 2,392,892 | Ward | Jan. 15, 1946 |

FOREIGN PATENTS

| Number | Country | Date |
|---|---|---|
| 839,099 | France | Dec. 26, 1938 |